United States Patent
Okubo et al.

(10) Patent No.: US 11,760,225 B2
(45) Date of Patent: Sep. 19, 2023

(54) BATTERY DEPLETION PREVENTION APPARATUS

(71) Applicant: HONDA MOTOR CO., LTD., Tokyo (JP)

(72) Inventors: Satoru Okubo, Tokyo (JP); Koki Fujisawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 520 days.

(21) Appl. No.: 17/018,688

(22) Filed: Sep. 11, 2020

(65) Prior Publication Data

US 2021/0078441 A1 Mar. 18, 2021

(30) Foreign Application Priority Data

Sep. 18, 2019 (JP) .................................. 2019-169422

(51) Int. Cl.
| | |
|---|---|
| *B60L 58/14* | (2019.01) |
| *H04L 9/40* | (2022.01) |
| *G06N 5/04* | (2023.01) |
| *G06Q 50/30* | (2012.01) |
| *G06Q 10/02* | (2012.01) |

(Continued)

(52) U.S. Cl.
CPC ............... *B60L 58/14* (2019.02); *B60L 53/62* (2019.02); *B60R 25/01* (2013.01); *B60R 25/10* (2013.01); *B60R 25/241* (2013.01); *G06N 5/04* (2013.01); *G06Q 10/02* (2013.01); *G06Q 10/06311* (2013.01); *G06Q 10/06315* (2013.01); *G06Q 30/0284* (2013.01); *G06Q 30/0645* (2013.01);

(Continued)

(58) Field of Classification Search
CPC ......... B60L 58/14; B60L 53/62; G06Q 10/02; G06Q 10/06311; G06Q 10/06315; G06Q 50/30; H04L 63/0838
USPC .......................................................... 701/22
See application file for complete search history.

(56) References Cited

U.S. PATENT DOCUMENTS

| | | | |
|---|---|---|---|
| 9,586,579 B1 | 3/2017 | Laskowsky et al. | |
| 2012/0005125 A1* | 1/2012 | Jammer | B60L 53/64 705/412 |

(Continued)

FOREIGN PATENT DOCUMENTS

| | | |
|---|---|---|
| JP | 05-038990 A | 2/1993 |
| JP | 05-336252 A | 12/1993 |

(Continued)

OTHER PUBLICATIONS

Notice of Reasons for Refusal dated May 31, 2022 corresponding to Japanese Patent Application No. 2019-169422, and English translation thereof.

*Primary Examiner* — Krishnan Ramesh
(74) *Attorney, Agent, or Firm* — SQUIRE PATTON BOGGS (US) LLP (57) ABSTRACT

A battery depletion prevention apparatus including a microprocessor and a memory coupled to the microprocessor. The microprocessor and the memory are configured to perform registering an information of a user, acquiring an information of a remaining battery capacity of a vehicle, predicting a possibility of a battery depletion of the vehicle based on the information of the remaining battery capacity, and transmitting a use request command for requesting the user to use the vehicle for charging a battery of the vehicle to a user terminal of the user based on the possibility of the battery depletion.

7 Claims, 4 Drawing Sheets

(51) Int. Cl.
*G06Q 10/0631* (2023.01)
*G06Q 30/0645* (2023.01)
*G06Q 30/0283* (2023.01)
*B60R 25/10* (2013.01)
*B60R 25/01* (2013.01)
*B60R 25/24* (2013.01)
*B60L 53/62* (2019.01)

(52) U.S. Cl.
CPC ......... *G06Q 50/30* (2013.01); *H04L 63/0838* (2013.01); *G06Q 2240/00* (2013.01)

(56) References Cited

U.S. PATENT DOCUMENTS

| | | | | |
|---|---|---|---|---|
| 2012/0310471 | A1* | 12/2012 | Sengoku | B60L 58/14 |
| | | | | 701/31.5 |
| 2017/0129361 | A1* | 5/2017 | Scaringe | H02J 7/0048 |
| 2019/0160960 | A1* | 5/2019 | Onodera | G06Q 30/0283 |
| 2020/0009983 | A1* | 1/2020 | Oshima | G05B 19/042 |

FOREIGN PATENT DOCUMENTS

| | | | |
|---|---|---|---|
| JP | 11-240429 | A | 9/1999 |
| JP | 2004-142661 | A | 5/2004 |
| JP | 2004-178385 | A | 6/2004 |
| JP | 2007-253716 | A | 10/2007 |
| JP | 2020-123027 | A | 8/2020 |

\* cited by examiner

BATTERY DEPLETION PREVENTION APPARATUS

CROSS-REFERENCE TO RELATED APPLICATION

This application is based upon and claims the benefit of priority from Japanese Patent Application No. 2019-169422 filed on Sep. 18, 2019, the content of which is incorporated herein by reference.

BACKGROUND OF THE INVENTION

Field of the Invention

This invention relates to a battery depletion prevention apparatus, a battery depletion prevention system and a battery depletion prevention method for preventing a battery depletion prevention of a vehicle.

Description of the Related Art

Recently, a vehicle rental service in which a vehicle is rented unmanned by using an IC card or the like registered in advance and a user is charged in accordance with the use time and the use distance of the vehicle when the vehicle is returned has become widespread (for example, disclosed in Japanese Patent Laid-Open No. 2004-178385).

In such a vehicle rental service, an on-vehicle terminal capable of communicating with a server apparatus for managing the use of a vehicle used in the vehicle rental service is mounted on a vehicle. In the vehicle rental service, a battery of the vehicle is consumed even when vehicle is not used by communicating with the server apparatus using this on-vehicle terminal. For this reason, for example, if vehicle is not used for a long time, remaining battery capacity may be lowered and the on-vehicle terminal may become difficult to operate. If the on-vehicle terminal does not operate, communication with the server apparatus may become impossible, and data communication with vehicle may become impossible. For example, an unlock signal of vehicle doors may not be transmitted, and the vehicle may not be rented out.

SUMMARY OF THE INVENTION

An aspect of the present invention is a battery depletion prevention apparatus. The battery depletion prevention apparatus includes a microprocessor and a memory coupled to the microprocessor. The microprocessor and the memory are configured to perform registering an information of a user, acquiring an information of a remaining battery capacity of a vehicle, predicting a possibility of a battery depletion of the vehicle based on the information of the remaining battery capacity, and transmitting a use request command for requesting the user to use the vehicle for charging a battery of the vehicle to a user terminal of the user based on the possibility of the battery depletion.

Another aspect of the present invention is a battery depletion prevention system. The battery depletion prevention system includes the battery depletion prevention apparatus, and an on-vehicle terminal capable of communicating with the battery depletion prevention apparatus.

Another aspect of the present invention is a battery depletion prevention method. The battery depletion prevention method includes registering an information of a user, acquiring an information of a remaining battery capacity of a vehicle, predicting a possibility of a battery depletion of the vehicle based on the information of the remaining battery capacity, and transmitting a use request command for requesting the user to use the vehicle for charging a battery of the vehicle to a user terminal of the user based on the possibility of the battery depletion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 4. The battery depletion prevention apparatus according to an embodiment of the present invention is suitably used for preventing battery depletion of a vehicle owned a business entity providing a vehicle rental service. The vehicle rental service includes a service such as the car sharing service and a car rental service.

The car sharing service is a service in which unmanned vehicles (shared vehicles) are rented using an IC card or the like registered in advance, and a user is charged according to the vehicle usage time and usage distance (mileage) when the vehicle is returned. The car rental service differs from the car sharing service in that the user rent a car (shared vehicle) facing a store clerk.

The battery depletion prevention apparatus according to the present embodiment can be used for a vehicle owned a business entity that provides the car rental service, but is suitable for use for a business entity that provides the car sharing service. Hereafter, an example of using the battery depletion prevention apparatus on the vehicle owned by the business entity that provides a car sharing service will be described.

Figure 1:
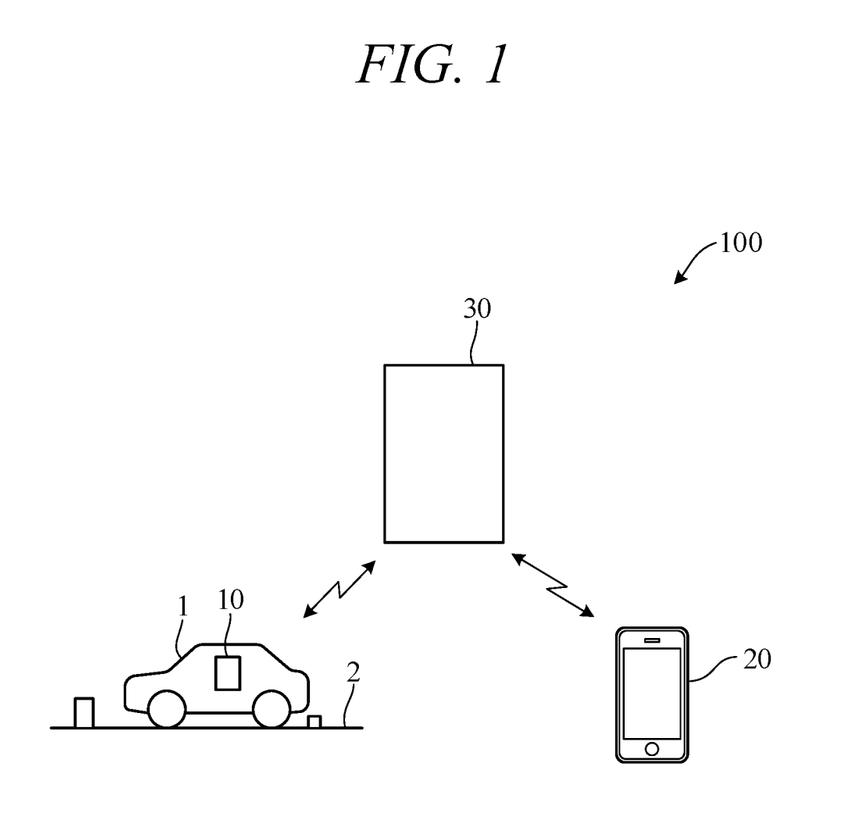
FIG. 1 is a schematic configuration diagram of a battery depletion prevention system using a server apparatus according to an embodiment of the present invention.

FIG. 1 is a schematic configuration diagram of a battery depletion prevention system 100 using a server apparatus 30 according to the present embodiment. The battery depletion prevention system 100 includes a vehicle 1 owned a business entity that conducts car sharing business, a user terminal 20 owned a user who uses the car sharing service, and the server apparatus 30 owned the business entity that conducts the car sharing business. The battery depletion prevention apparatus according to the present embodiment is configured by the server apparatus 30.

An on-vehicle terminal 10 is mounted on the vehicle 1 owned the business entity that conducts the car sharing business and used for the car sharing business, and the on-vehicle terminal 10 can communicate with the server apparatus 30. The server apparatus 30 performs reservation management by the user, use management of the vehicle used for the car sharing service, and the like. The user terminal 20 is a portable wireless terminal and the like operated by the user who uses the car sharing service and can communicate with the server apparatus 30.

For the sake of convenience, a single vehicle 1 is shown in FIG. 1, but the business entity conducting the car sharing business has a plurality of vehicle 1, each of which is parked in a corresponding vehicle compartment 2. Similarly, although single user terminal 20 is shown in FIG. 1, a plurality of users are registered in car sharing service and each of the plurality of users has a user terminal 20.

The vehicle 1 includes various types of four-wheel vehicle with varying car sizes (body size, luggage compartment capacity, etc.) such as sedans, minivans, one-box cars, wagons, trucks, etc. The vehicle 1 may be a dedicated vehicle type for car sharing business, but by providing various types of vehicle 1, the user has more choices of vehicle type and the convenience of car sharing service is improved. The vehicle compartment 2 used for the car sharing service is a rental location and a return location of the vehicle 1, and when the user uses the vehicle 1, the same vehicle compartment 2 becomes renting location and return location of the vehicle 1. The user who uses the car sharing service is the person who registered beforehand the data required for business entity who conducts the car sharing business.

At the time of starting the use of the car sharing service, when the user brings the IC card (authentication card) registered in advance close to the card reader mounted on the vehicle 1 (on-vehicle terminal 10), the card reader authenticates the IC card (authentication card). The on-vehicle terminal 10 transmits a user information read from the IC card by the card reader to the server apparatus 30. The server apparatus 30 determines whether or not there is vehicle reservation information or the like corresponding to the received user information, and if there is corresponding vehicle reservation information or the like, transmits an unlock command to the vehicle 1 (on-vehicle terminal 10). As a result, the vehicle 1 becomes available.

Incidentally, the server apparatus 30 used for the car sharing service provided as described above performs communication with the on-vehicle terminal 10 mounted on vehicle 1, and manages the vehicle 1 by transmitting and receiving various data relating to the vehicle 1. Such communication is performed by the on-vehicle terminal 10 utilizing the power provided by a battery on mounted on the vehicle 1, even during periods when the vehicle 1 is not used. Therefore, the battery mounted on the vehicle 1 is consumed even during times when vehicle 1 is not used.

Therefore, if the vehicle 1 is not used for a long time, the remaining battery capacity (SOC (State of Charge)) may be lowered and the on-vehicle terminal 10 may be difficult to operate. Thus, for example, even if the unlock command is transmitted from the server apparatus 30 to the on-vehicle terminal 10 at the time of renting the vehicle 1, the vehicle 1 doors may not be unlocked and it is possible to be not able to rent out the vehicle 1. When such a situation occurs, the user may lose opportunity to use the car sharing service and the user's satisfaction with the car sharing service may be reduced, which may cause the user to leave.

On the other hand, when a decrease in the remaining battery capacity of the vehicle 1 is detected, a person such as a service personnel can be dispatched from the car sharing business entity to take a battery recovery measure, but dispatching the person and the like are costly and is inappropriate.

Therefore, in the battery depletion prevention apparatus according to the present embodiment, the possibility of battery depletion of the vehicle 1 is predicted, and use request is performed to a user registered as a member of car sharing service (hereinafter, referred to as a registered user) based on the predicted possibility of battery depletion. The use request is a requirement to encourage the registered user to use the vehicle 1 to charge the battery by vehicle use. Then, to the user using the vehicle 1 in response to the use request, a discount service applicable when using the car sharing service is provided.

Figure 2:
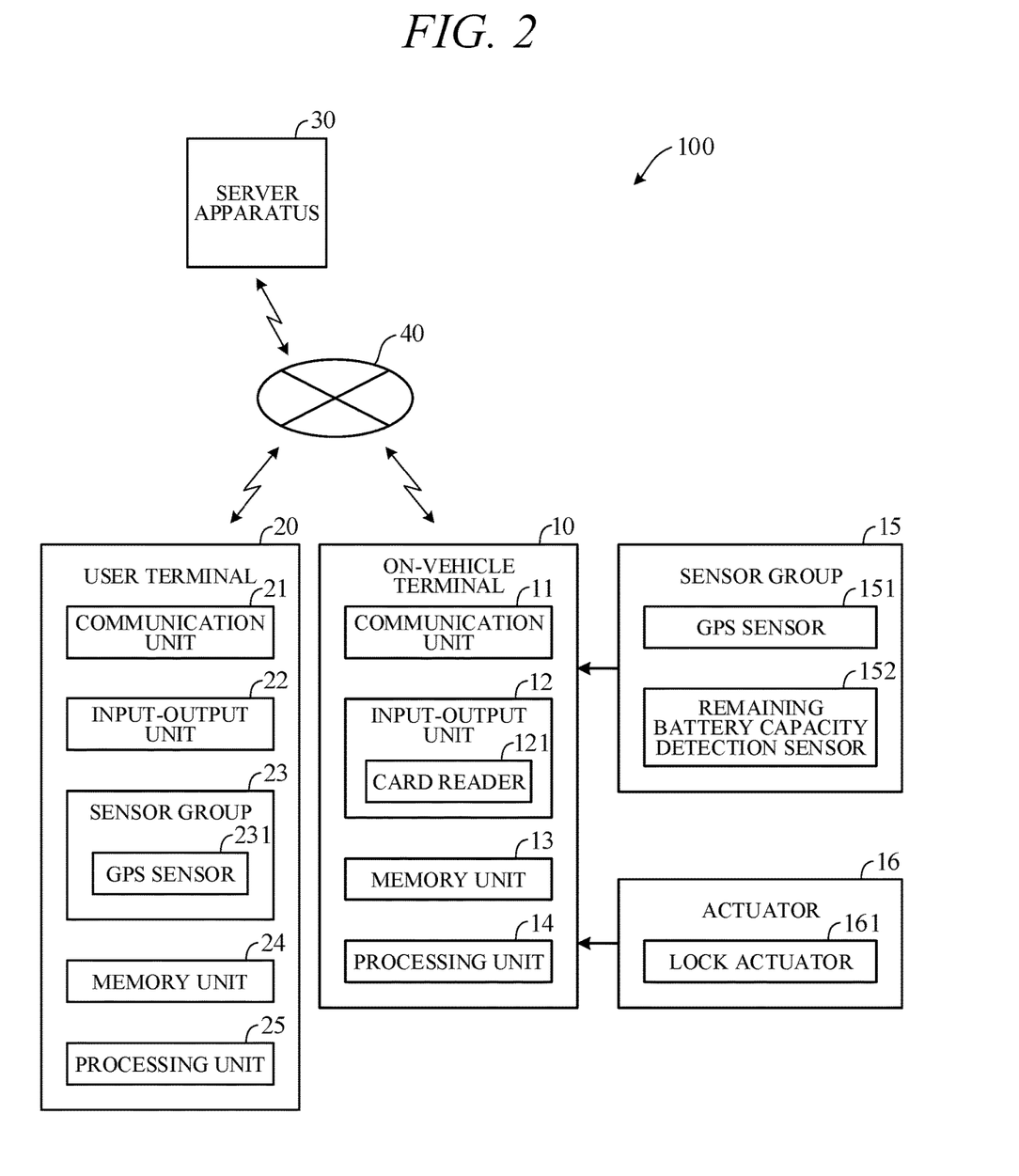
FIG. 2 is a block diagram showing a configuration of a main component of the battery depletion prevention system shown in FIG. 1.

FIG. 2 is a block diagram showing a configuration of a main component of the battery depletion prevention system 100 shown in FIG. 1. As shown in FIG. 2, the on-vehicle terminal 10, the user terminal 20 and the server apparatus 30 are coupled to a communication network 40, such as a wireless communication network, an Internet network, or a telephone line network. Although single on-vehicle terminal 10 and single user terminal 20 are shown in FIG. 2 for convenience, a plurality of the on-vehicle terminal 10 and a plurality of the user terminal 20 may be connected to the communication network 40.

The on-vehicle terminal 10 includes, for example, an on-vehicle navigation apparatus. As shown in FIG. 2, the on-vehicle terminal 10 includes a communication unit 11, an input-output unit 12, a memory unit 13, and a processing unit 14. a sensor group 15 and actuator 16 connected to the on-vehicle terminal 10.

The communication unit 11 is configured to be able to communicate with server apparatus 30 via a communication network 40 by wireless communication. The input-output unit 12 is a generic term for a device for inputting and outputting various commands and various data, and includes various switches, buttons, microphones, speakers, monitors, and the like that can be operated by the user. In addition, the input-output unit 12 has a card reader 121 for reading user information from an authentication card owned by the user. For example, a driver's license (IC card license) in which an integrated circuit (IC) storing personal data of the user is incorporated is used as authentication card. The card reader 121 is provided at a predetermined portion of vehicle 1, for example, below the rear window, so that the authentication card approached from the outside of the vehicle 1 can be recognized.

The memory unit 13 has a volatile or nonvolatile memory (not shown). The memory unit 13 stores various programs and various data executed by the processing unit 14. For example, programs, map data and the like related to the navigation function are stored in the memory unit 13. Further, data detected by the sensor group 15 is temporarily stored.

The processing unit 14 has a microprocessor, executes predetermined processing based on a signal inputted via the input-output unit 12, a signal detected by the sensor group 15, a signal received from the outside of the on-vehicle terminal 10 via the communication unit 11, and programs and data stored in the memory unit 13, and outputs control signals to the actuator 16, the input-output unit 12, the memory unit 13 and the communication unit 11.

The processing unit 14 outputs a control signal to the communication unit 11 and controls transmission and reception of a signal between the on-vehicle terminal 10 and the server apparatus 30. For example, the processing unit 14, when the user brings the IC card (authentication card) previously registered close to the card reader 121 at the beginning of using the car sharing service, outputs a transmission command of the user information read by the card reader 121 to the communication unit 11. The communication unit 11 transmits the user information to the server apparatus 30 in accordance with the transmission command.

The server apparatus 30 determines the presence or absence of a vehicle reservation information and the like corresponding to the received user information. Specifically, the server apparatus 30 determines whether or not the corresponding vehicle reservation information or the like is stored in a database (a vehicle database 331 to be described later). The server apparatus 30 sends an unlock command to the on-vehicle terminal 10 (the processing unit 14) if the corresponding vehicle reservation information and the like are stored in the database. If there are no corresponding vehicle reservation information and the like in the database, sends a lock command. The processing unit 14 outputs an unlock signal when receiving the unlock command and outputs a lock signal when receiving the lock command to a lock actuator 161 to be described later respectively.

The processing unit 14 outputs a transmission command of the information detected by the sensor group 15 together with a vehicle ID for identifying the vehicle 1 to the communication unit 11 at predetermined time intervals. For example, the processing unit 14 outputs a transmission command of remaining battery capacity detected by a remaining battery capacity detection sensor 152 to be described later to communication unit 11 at predetermined time intervals. The communication unit 11 transmits the information detected by the sensor group 15 to the server apparatus 30 in accordance with the transmission command from the processing unit 14.

The sensor group 15 includes various sensors that detect vehicle conditions. For example, the sensor group 15 has a GPS sensor 151 for detecting the position of the vehicle 1 by receiving a signal from a GPS satellite, and a remaining battery capacity detection sensor 152 for detecting remaining battery capacity of the vehicle 1. Although not shown, a vehicle speed sensor for detecting a vehicle speed, an acceleration sensor for detecting an acceleration, a gyro sensor for detecting an angular velocity, a mileage sensor for detecting a mileage, a residual fuel detecting sensor for detecting a residual fuel quantity, and the like are also included in the sensor group 15.

The actuator 16 drives various devices mounted on the vehicle 1 based on signals from the on-vehicle terminal 10 (processing unit 14). The actuator 16 has, as an example, the lock actuator 161 for unlocking or locking the door lock. The lock actuator 161 unlocks the door lock based on the unlock signal from the processing unit 14 and locks the door lock based on the lock signal from the processing unit 14. Although not shown, an engine driving actuator, a transmission driving actuator, an actuator for driving a braking device, a steering actuator, and the like are also included in the actuator 16.

The user terminal 20 is configured by a personal computer operated by a user, a portable wireless terminal represented by a smartphone, or the like. As shown in FIG. 2, the user terminal 20 includes a communication unit 21, an input-output unit 22, a sensor group 23, a memory unit 24, and a processing unit 25.

The communication unit 21 is configured to be able to communicate with the server apparatus 30 via a communication network 40 by wireless communication. The input-output unit 22 is a generic term for a device for inputting and outputting various commands and various data, and includes various switches, buttons, microphones, speakers, monitors, and the like that can be operated by the user. The user inputs user information via the input-output unit 22. The user information includes an address, a name, a contact address, a license number, information necessary for settlement (for example, a credit card number), and the like of the user. The user information input through the input-output unit 22 is transmitted to the server apparatus 30 through the communication unit 21 by the processing unit 25, and the server apparatus 30 (reservation management unit 341 to be described later) registers the received user information in the database (user database 333 to be described later). Thus, the user is registered as a member of the car sharing service.

The vehicle reservation information is inputted by the user via the user terminal 20 (input-output unit 22) when applying for the use of vehicle. The vehicle reservation information includes information indicating the use date and time (the use starting date and time and the use ending date and time) of the vehicle 1 and the like. The vehicle reservation information is sent to the communication unit 21 via the server apparatus 30. When receiving the vehicle reservation information from the user terminal 20, the server apparatus 30 searches for the vehicle 1 that can be reserved satisfying the usage date and time conditions. And then, the server apparatus 30 transmits the information of the searched vehicle 1 (hereinafter, referred to as vehicle information) and the information of the parking lot in which the vehicle 1 is parked (hereinafter, referred to as parking lot information).

The user terminal 20 (processing unit 25) displays a list of searched vehicles 1 on an input-output unit 22 (e.g., a monitor) based on the received vehicle information and the received parking lot information. In the list of searched vehicles 1, information that can specify a parking lot in which the vehicle 1 is parked is also displayed. When the user selects a desired vehicle 1 via the input-output unit 22 from the list of vehicles 1 displayed on the input-output unit 22, an appointment of the vehicle 1 is confirmed.

The sensor group 23 includes various sensors for detecting the condition of the user terminal 20. For example, the sensor group 23 has a GPS sensor 231 that receives signals from GPS satellites to detect the position of the user terminal 20. Although illustration is omitted, a remaining battery capacity detection sensor for detecting remaining battery capacity of the user terminal 20, a radio wave reception sensor for detecting the reception state of the radio wave, and the like are also included in the sensor group 23. The server apparatus 30 can identify the user who is close to the vehicle 1 by receiving data of the position of the user terminal 20 detected by the GPS sensor 231.

The Memory unit 24 has a volatile or nonvolatile memory (not shown). The memory unit 24 stores various programs executed by the processing unit 25 and various types of data. For example, the memory unit 24 stores the vehicle reservation information of the car sharing service and the like.

The processing unit 25 includes a microprocessor, executes predetermined processing based on a signal input via the input-output unit 22, a signal received from the outside of the user terminal 20 via the communication unit 21, the positional data of the user terminal 20 input via the sensor group 23, programs and data stored in the memory unit 24, and the like, and outputs control signals to the communication unit 21, the input-output unit 22, and the memory unit 24, respectively.

The processing unit 25 outputs a control signal to the communication unit 21 and controls transmission and reception of a signal between the user terminal 20 and the server apparatus 30. For example, the processing unit 25 transmits, to the server apparatus 30 via the communication unit 21, signals for instructing reservation application, reservation cancellation, and the like of the vehicle 1, and the positional data of the user terminal 20 detected by the GPS sensor 231, together with the user ID for identifying the user. By this process in processing unit 25, the user can change or confirm the reserved vehicle via the input-output unit 22 (monitor, etc.).

Figure 3:
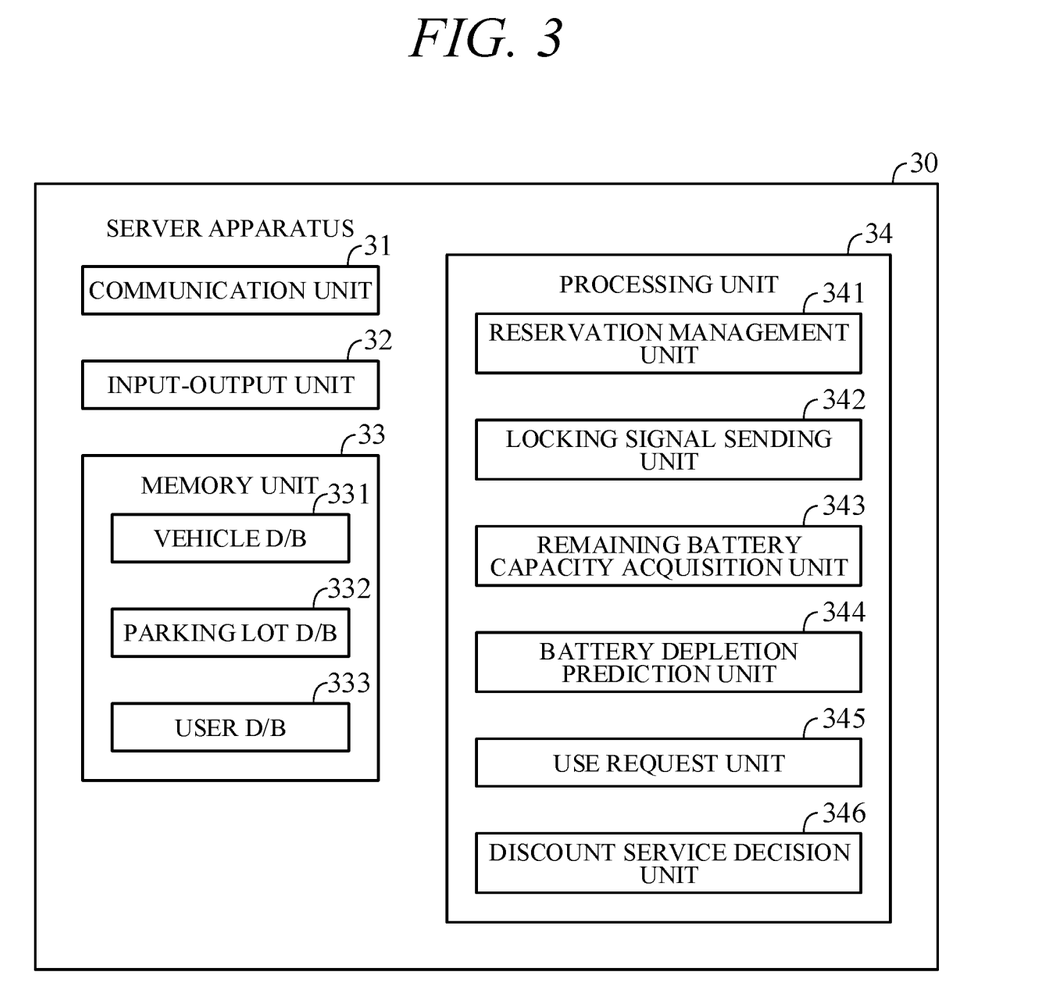
FIG. 3 is a block diagram showing a configuration of a main component of the server apparatus shown in FIG. 2.

FIG. 3 is a block diagram showing a configuration of a main component of the server apparatus 30 shown in FIG. 2. The server apparatus 30 is provided, for example, in a business entity which provides the car sharing service. The server apparatus 30 can also be configured on cloud computing using a virtual server function. As shown in FIG. 3, the server apparatus 30 includes a communication unit 31, an input-output unit 32, a memory unit 33, and a processing unit 34.

The communication unit 31 is configured to communicate wirelessly with the on-vehicle terminal 10 and the user terminal 20 via a communication network 40. The input-output unit 32 includes keyboards, mice, microphones, monitors, touch panels, speakers, and the like that can be operated by a user.

The memory unit 33 has a volatile or nonvolatile memory (not shown). The memory unit 33 stores various programs and various data executed by processing unit 34. The memory unit 33 includes a vehicle database (vehicle D/B) 331, a parking lot database (parking lot D/B) 332, and a user database (user DB) 333 as the functional constituents of the memories.

The vehicle database 331 stores vehicle information of each of a plurality of vehicle 1 used for the car sharing service, that is, information representing vehicle states and vehicle characteristics such as a vehicle type, a model year, a vehicle body number, a vehicle number, a mileage, a maintenance history, an operation rate, and the like of each vehicle 1, and usage plans of each vehicle 1 together with the vehicle ID of each vehicle 1. The usage plan includes the time series usage record of each vehicle 1, the time series vehicle reservation information of the present and future (the use starting date and time and the use ending date and time, etc.), and a maintenance plan executed prior to the use starting time of the vehicle 1.

The parking lot database 332 stores, together with a parking lot ID, parking lot information of the parking lot having the vehicle compartment 2 in which the vehicle 1 used for car sharing service is to be parked, specifically, the address of each parking lot, the position of the vehicle compartment 2 in each parking lot, and the vehicle ID of the vehicle 1 parked in the vehicle compartment 2.

The user database 333 stores, together with the user ID, user information including the address, name, contact address, license number, and information necessary for settlement of each user input through the user terminal 20 (input-output unit 22).

The processing unit 34 includes a microprocessor. The processing unit 34 executes predetermined processes based on a signal received from the outside of the server apparatus 30 via the communication unit 31, a signal inputted via the input-output unit 32, and programs and data stored in the memory unit 33, and outputs control signals to the communication unit 31, the input-output unit 32 and the memory unit 33.

The processing unit 34 includes a reservation management unit 341, a lock signal transmitting unit 342, a remaining battery capacity acquisition unit 343, a battery depletion prediction unit 344, a use request unit 345, and a discount service determining unit 346 as functional constituents of the processor.

The reservation management unit 341 accepts usage application of the vehicle 1 from the user via the user terminal 20 (input-output unit 22). Specifically, the reservation management unit 341 receives vehicle reservation information input by the user via the input-output unit 22 from user terminal 20 via communication unit 31. The reservation management unit 341 searches for the vehicle 1 that can be reserved, that is, the vehicle 1 that meets the condition of the use date and time specified in the received vehicle reservation information. The reservation management unit 341 transmits information of the searched vehicle 1 and the vehicle compartment 2 in which the vehicle 1 is parked to the user terminal 20. The user terminal 20 displays a list of the searched vehicle 1 on input-output unit 22 based on the received information of the vehicle 1 and the vehicle compartment 2. In the list of the searched vehicle 1, information that can specify the vehicle compartment 2 in which the vehicle 1 is parked is also displayed. When the user selects the desired vehicle 1 from the list displayed on the input-output unit 22, the selected vehicle 1 is confirmed as the reservation vehicle.

The reservation management unit 341 generates current and future usage plans for each vehicle 1 and registers the generated usage plans in the vehicle database 331. Specifically, the reservation management unit 341 updates the use plan of the reservation vehicle for which the reservation is confirmed and registers the updated use plan in the vehicle database 331.

When receiving the user information read by the card reader 121 from the on-vehicle terminal 10, the lock signal transmitting unit 342 determines whether or not there is a vehicle reservation information and the like corresponding to the user information, and transmits an unlock signal to the on-vehicle terminal 10 through the communication unit 31 if there is a corresponding vehicle reservation information, and transmits a lock signal if there is no corresponding vehicle reservation information.

The remaining battery capacity acquisition unit 343 obtains information of the remaining battery capacity of the vehicle 1. For example, the remaining battery capacity acquisition unit 343 receives information indicating of the remaining battery capacity detected by the remaining battery capacity detection sensor 152 from the vehicle 1 through the communication unit 31.

The battery depletion prediction unit 344 predicts battery depletion of the vehicle 1 based on information of the remaining battery capacity received by the remaining battery capacity acquisition unit 343. Specifically, the battery depletion prediction unit 344 predicts that the battery will be depleted within a predetermined time interval when the remaining battery capacity falls below a predetermined threshold.

For example, the battery depletion prediction unit 344 predicts that the battery will be depleted within three days when the remaining battery capacity falls below the first threshold, predicts that the battery will be depleted within two days when the remaining battery capacity falls below the second threshold value (<first threshold value), and predicts that the battery will be depleted within one day when the remaining battery capacity falls below the third threshold value (<second threshold value).

Based on the usage plan created by reservation management unit 341, the battery depletion prediction unit 344 predicts whether or not the battery will be depleted by the latest use starting date and time. For example, the battery depletion prediction unit 344 predicts that the battery will be depleted if the remaining battery capacity becomes equal to or less than the first threshold value in a case where the latest use starting date is three days later, predicts that the battery will be depleted if the remaining battery capacity becomes equal to or less than the second threshold value in a case where the latest use starting date is two days later, and predicts that the battery will be depleted if the remaining battery capacity becomes equal to or less than the third threshold value in a case where the latest use starting date is one day later.

The use request unit 345 performs the use request of the vehicle 1 to the registered user based on the predicted battery depletion by the battery depletion prediction unit 344. More particularly, the use request unit 345 transmits the user terminal 20 of the registered user a command (hereinafter referred to as use request command) for requesting the use of the vehicle 1 to charge the battery.

The use request unit 345 performs the use request to the registered user when it is predicted that the battery will be depleted by the latest use starting date and time. The use request unit 345 may then perform the use request to a particular user rather than all users based on the distance between the vehicle 1 and the user. For example, the use request unit 345 may identify the user who is within a radius 3 km around the vehicle 1 based on the position information of the vehicle 1 and the user terminal 20 detected by the GPS sensors 151 and 231, and perform the use request to the identified user.

The usage form of the vehicle 1 in carrying out the battery charge by the vehicle usage includes a first usage form of using the car sharing service and a second usage form of simply using the vehicle 1 to charge the battery without using the car sharing service Therefore, when performing the use request to the registered user, the use request unit 345 performs a select request of the usage form together with the use request. Specifically, the use request unit 345 transmits, to the user terminal 20, a command for requesting selection of a usage form (hereinafter referred to as "selection request command") together with the use request command.

When the user receives the use request and the select request of the usage form via the user terminal 20 (input-output unit 22), the user selects a usage form for charging the battery via the input-output unit 22. In response to the use request command, the user terminal 20 (processing unit 25) transmits to server apparatus 30 information indicating the selection result of the usage form.

When receiving the information indicating the selection result of the usage form, the reservation management unit 341 performs a predetermined process based on the selection result and updates the usage plan. Specifically, when the user selects the first usage form, the reservation management unit 341 confirms a reservation of the vehicle 1 based on the usage application of the car sharing service from the user. On the other hand, when the user selects the second usage form, the reservation management unit 341 issues a one-time key. The one-time key is an authentication key that can be used only once, and the user can use (unlock) the vehicle 1 by using the one-time key without using the car sharing service. The one-time key, for example, is made available by the accessing a predetermined URL transmitted in advance to the user terminal 20. The one-time key expires once it is used.

When transmitting the use request command, the use request unit 345 may also transmit information of the vehicle traveling time required to recover the battery. At that time, since the battery charge by the vehicle usage is realized by approximately 30 minutes of vehicle running, the use request unit 345 sets a time of about 1 hour as vehicle traveling time required for battery recovery. The use request unit 345 may calculate vehicle traveling time required to recover the battery based on remaining battery capacity acquired by the remaining battery capacity acquisition unit 343. This allows the user to determine whether or not to depend on the use request based on the vehicle traveling time required for battery recovery. When receiving information indicating the selection result of the usage form from the user terminal 20 via the communication unit 31, the use request unit 345 notifies the user terminal 20 of the registered user that a user who is requested the use of the vehicle 1 for charging the battery has been determined.

If the user does not respond to the use request even after a predetermined time interval has elapsed, the reservation management unit 341 incorporates the battery recovery measure by dispatching personnel into the usage plan of the vehicle 1.

The discount service determining unit 346 determines the applicable discount service when using car sharing service and provides the determined discount service to the user who used the vehicle 1 according to the use request. For example, the discount service determining unit 346 issues coupons applicable when using car sharing service. The coupons include a discount coupon issued when the vehicle 1 is used in the first usage form and a discount coupon issued when vehicle 1 is used in the second usage form. As an applicable discount service when using the car sharing service, a discount service other than the discount coupon may be provided to the user.

The discount coupon issued when the vehicle 1 is used in the first usage form makes the use fee when a reservation of the car sharing service is performed according to the use request lower than the normal use fee. For example, when the vehicle 1 is used in the first usage form, a discount coupon for discounting the use fee by 1000 yen from the normal fee or giving a 20% discount of the normal fee is issued.

The discount coupon issued when the vehicle 1 is used in the second usage form is a discount coupon applicable to the next use of the car sharing service, and the discount rate is made higher (the use fee is made lower) than the discount coupon issued when the vehicle 1 is used in the first usage form. For example, when the vehicle 1 is used in the second usage form, the discount coupon for discounting the usage fee by 1,500 yen from the normal fee or giving a 30% discount of the normal fee is issued.

Figure 4:
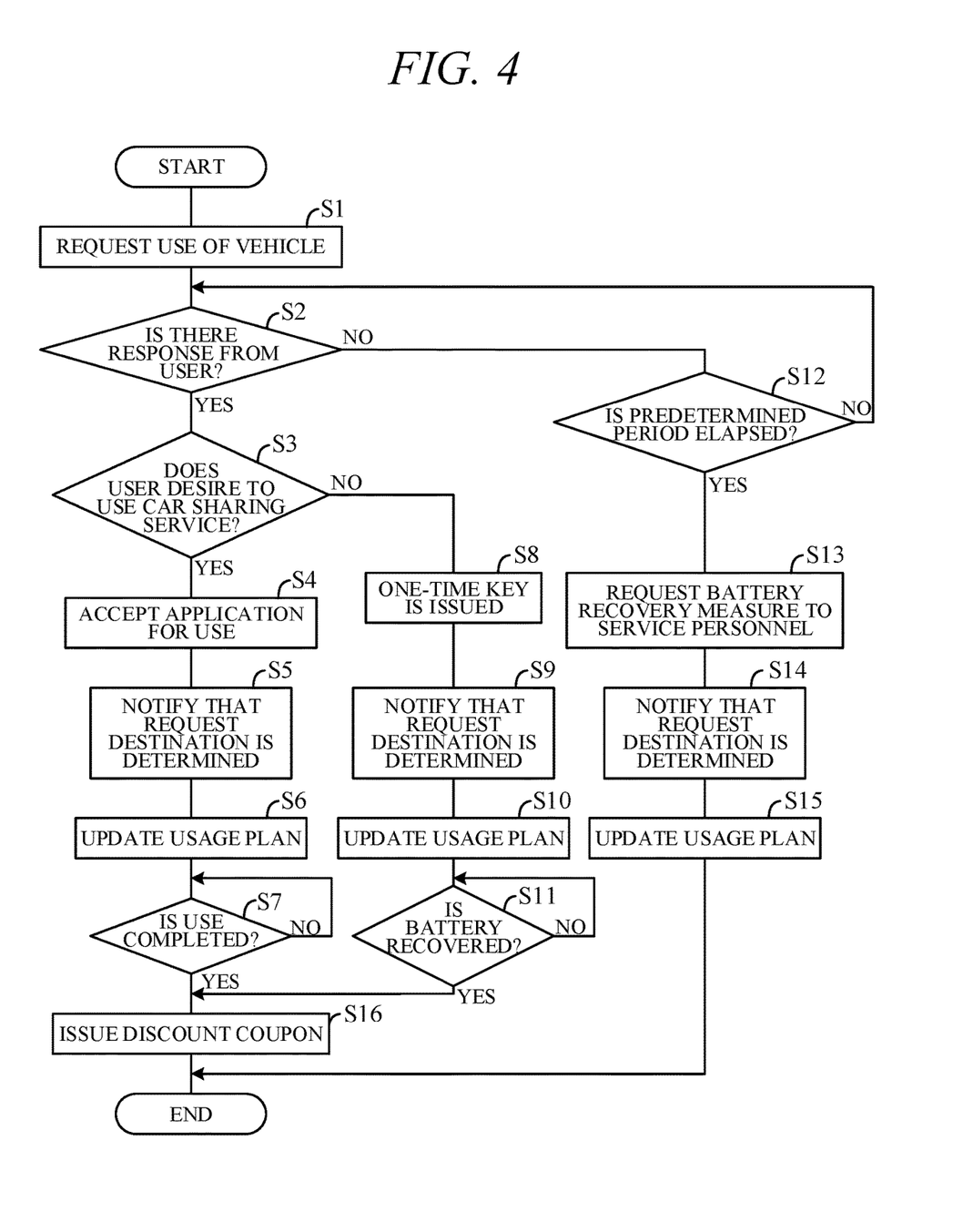
FIG. 4 is a flowchart showing an example of a battery depletion preventing process of the server apparatus shown in FIG. 2.

FIG. 4 is a flowchart showing an example of battery depletion preventing process performed in the processing unit 34 of the server apparatus 30 shown in FIG. 2. In principle, the process shown in the flow chart is started when the battery depletion prediction unit 344 predicts that the battery will be depleted by the latest use starting date and time of the vehicle 1, that is, when the remaining battery capacity of the vehicle 1 becomes equal to or less than the predetermined threshold.

First, in step S1 (S: processing Step), the use request to the registered user is performed by the process in the use request unit 345. More specifically, the use request command is transmitted to the user terminal 20 owned by the registered user. Next, in S2, by the process in the use request unit 345, it is determined whether or not there is a response to the use request from the registered user.

When the result in S2 is YES, in S3, it is determined whether or not the first usage form is selected by the process in the use request unit 345, that is, whether or not the user desires the usage form using the car sharing service. Hereafter, the user who responded to use request is referred to as a user A.

When the result in S3 is YES, in S4, by the process in the reservation management unit 341, an application for the use of the vehicle 1 from the user A is accepted. At this time, the user A can apply for the use of the time zone up to the latest use starting date and time of the vehicle 1. Next, in S5, by the process in the use request unit 345, a notification for notifying that a request destination user is already determined (hereinafter, referred to a request destination determination notification) is performed to the registered user other than the user A. Next, in S6, by the process in the reservation management unit 341, the usage plan of the vehicle 1 is updated based on the vehicle reservation information inputted by the user A at the time of application for the use of the vehicle 1 in S4. Next, in S7, it is determined whether or not the use of the vehicle 1 by the user A is completed by the process in the reservation management unit 341. S7 is repeated until the result is YES. When the result in S7 is YES, in S16, by the process in the discount service determining unit 346, a discount coupon is issued to the user A and the process is terminated.

On the other hand, when the result in S3 is NO, in S8, a one-time key is issued to the user A by the process in the discount service determining unit 346. Then, in S9, by the process in the use request unit 345, the request destination determination notification is performed to the registered user other than the user A. Next, in S10, the battery charge by the vehicle usage is incorporated into the usage plan of the vehicle 1 as a maintenance schedule by the processing in reservation management unit 341, and the processing is terminated. Next, in S11, by the process in the battery depletion prediction unit 344, it is determined whether or not the battery of the vehicle 1 has been recovered. For example, if the latest use starting date of the vehicle 1 is two days later, it is determined that the battery has recovered if the remaining battery capacity exceeds the second threshold. A positive margin may be added to the threshold value used for the determination in S11. S11 is repeated until the result is YES. When the result in S11 is YES, the process proceeds to a step S16.

When the result in S2 is NO, in step S12, by the process in use request unit 345, it is determined whether or not a predetermined period has elapsed since the use request was performed. When the result in S12 is NO, the process returns to S2. When the result in S12 is YES, in S13, by the process in the use request unit 345, the battery recovery measure is requested to a predetermined person of the car sharing business entity, such as a service personnel. Specifically, information (vehicle ID, etc.) that can identify the vehicle 1 is transmitted to a portable wireless terminal carried by a service person or the like. Since the battery recovery measure needs to be completed by the latest use starting date and time, the predetermined time is determined based on the time at which use request is performed and the latest use start date and time. For example, the predetermined period is determined such that a request for the battery recovery measure by dispatching personnel is made by the date preceding the latest use starting date.

Next, in S14, by the process in the use request unit 345, the request destination determination notification is performed to the registered user. Next, in S15, by the processing in reservation management unit 341, the battery recovery measure by the dispatching personnel is incorporated into the usage plan of the vehicle 1 as the maintenance plan, and the process is terminated. The service personnel or the like who has received the request destination determination notification goes to the vehicle compartment 2 where the vehicle 1 is parked, and performs predetermined measures on the vehicle 1 to restore the battery of the vehicle 1. This prevents the battery depletion of the vehicle 1 even if none of the registered users responds to the use request.

The present embodiment can achieve advantages and effects such as the following:

(1) The Server apparatus 30 includes the user database 333 for registering user information; the remaining battery capacity acquisition unit 343 that acquires information of the remaining battery capacity of the vehicle 1, the battery depletion prediction unit 344 that predicts the battery depletion of the vehicle 1 based on the remaining battery capacity acquired by the remaining battery capacity acquisition unit 343, and the use request unit 345 that sends use request command for requesting to use the vehicle 1 for charging the battery to a user terminal 20 owned the user based on the battery depletion predicted by the battery depletion prediction unit 344.

Owing to this configuration, it is possible to efficiently and appropriately prevent the battery depletion of the vehicle 1 due to the fact that the vehicle 1 is not used for a long time.

(2) The vehicle 1 is a vehicle used for the car sharing service and the use request unit 345 sends the use request command to the user terminal 20 of the user who can use the car sharing service. The server apparatus 30 includes the discount service determining unit 346 that determines the discount service applicable to the car sharing service when the user who used the vehicle 1 based on the use request command sent by the use request unit 345. Owing to such a discount service, the registered user can be promoted to cooperate in charging the battery by the vehicle use, and the battery depletion of the vehicle 1 can be more reliably prevented. In addition, in the car sharing business entity, it is not necessary to dispatch personnel to take a battery recovery measure, so that costs can be reduced.

(3) The usage form of the vehicle 1 to charge the battery include the first usage form using the car sharing service and the second usage form using the vehicle 1 without using the car sharing service. The use request unit 345 sends the selection request command of the usage form along with the use request command to the user terminal 20. The use request unit 345 also issues the one-time key that is an authentication key and can be used only once to unlock the vehicle 1 to the user terminal 20 of the user who selects the second usage form based on the selection request command. As a result, even for a user who is not scheduled to use the car sharing service by the latest use starting date and time of the vehicle 1, the battery charge by the vehicle use can be promoted.

(4) The discount service determining unit 346 determines the discount service so that the discount rate for the user who uses the vehicle 1 in the second usage form is higher than that for the user who uses the vehicle 1 in the first usage form. As a result, a user who is not scheduled to use the car sharing service by the latest use starting date and time of the vehicle 1 can be further promoted to charge the battery by vehicle use.

(5) The battery depletion prediction unit 344 predicts the possibility of the battery depletion of the vehicle 1 at the starting time of the next rental based on the reservation status of the vehicle 1 used for the car sharing service. As a result, the on-vehicle terminal 10 can operate reliably when the user uses the vehicle 1 using the car sharing service. Accordingly, the vehicle 1 can be reliably rented to the user.

(6) When there is no response from the user terminal 20 to the use request command after a predetermined period has elapsed since the use request command is transmitted, the use request unit 345 transmits a command for requesting the battery recovery measure of the vehicle 1 to the terminal of the predetermined person (such as the service personnel) of the business entity providing the car sharing service. As a result, even when the user does not cooperate to charge the battery by the vehicle use, the battery depletion of the vehicle 1 can be prevented.

(7) The battery depletion prevention system 100 includes the server apparatus 30, the on-vehicle terminal 10 capable of communicating with the server apparatus 30, and the user terminal 20 capable of communicating with the server apparatus 30. As a result, it is possible to efficiently prevent the battery depletion of the vehicle 1 due to the fact that the vehicle 1 is not used for a long time.

(8) The on-vehicle terminal 10 has a communication unit 11 that transmits to the server apparatus 30 information of the remaining battery capacity detected by remaining battery capacity detection sensor 152 for detecting the remaining battery capacity of the vehicle 1 on which the on-vehicle terminal 10 is mounted. Owing to this configuration, the server apparatus 30 can monitor the remaining battery capacity of each of vehicles 1 communicably coupled to the server apparatus 30. Accordingly, it is possible to prevent the battery depletion of each of those vehicles 1.

(9) The battery depletion prevention apparatus according to the above embodiment can also be configured as a battery depletion prevention method. The battery depletion prevention method includes steps of registering the user information in the user database 333, obtaining the information of the remaining battery capacity of the vehicle 1, predicting the possibility of the battery depletion of the vehicle 1 based on the obtained information of the remaining battery capacity, and transmitting a use request command requesting the use of vehicle 1 for charging the battery to the user terminal 20 of the user based on the predicted possibility of the battery depletion (S1) by processing unit 34. As a result, it is possible to efficiently prevent the battery depletion of the vehicle 1 due to the fact that the vehicle 1 is not used for a long time.

In the above embodiment, it is determined whether or not the use of the vehicle 1 by the user A is completed (S7), but it may be determined whether or not the battery is recovered in addition to whether or not the use of the vehicle 1 is completed. If the battery is not recovered at the point in time when the use of the vehicle 1 is completed, a command requesting selection of whether or not to continue the use of the vehicle 1 may be transmitted to the user terminal 20 of the user A. Further, when the user A does not wish to continue the use of the vehicle 1, the discount coupon may not be issued to the user A in S16. When the above command is transmitted, it may be notified to the user terminal 20 that the discount coupon is not issued when the use of the vehicle 1 is terminated. Thereby, it can be expected that the use of the vehicle 1 is continued until the battery recovers, and the battery depletion of the vehicle 1 can be more reliably prevented.

In the above embodiment, the reservation management unit 341 registers the user information in the user database 333, but the configuration of a user information registering unit is not limited to this. That is, the user information registering unit may register the user information in a storage medium other than the user database 333, for example, a storage apparatus external to the server apparatus 30.

In the above embodiment, the battery depletion prevention apparatus is configured by the server apparatus owned by the business entity who conducts the car sharing business, but a battery depletion prevention apparatus according to the present embodiment may be configured by a server apparatus owned by a business entity who conducts the car rental business.

In the above embodiment, the vehicle used for the car sharing business is applied to the battery depletion prevention system, but a vehicle other than the vehicle used for the car sharing business, such as a vehicle owned by an individual, may be applied to a battery depletion prevention system according to the present embodiment.

According to the present invention embodiment, it is possible to appropriately prevent battery depletion of a vehicle due to a fact that the vehicle is not used for a long time.

Above, while the present invention has been described with reference to the preferred embodiments thereof, it will be understood, by those skilled in the art, that various changes and modifications may be made thereto without departing from the scope of the appended claims.

What is claimed is:

1. A battery depletion prevention apparatus comprising:
a microprocessor and a memory coupled to the microprocessor, wherein
the microprocessor and the memory are configured to perform:
registering an information of a user of a car sharing service;
acquiring an information of a remaining battery capacity of a vehicle which is used for the car sharing service;
predicting a possibility of a battery depletion of the vehicle based on the information of the remaining battery capacity;
transmitting a use request command for requesting the user to use the vehicle for charging a battery of the vehicle to a user terminal of the user based on the possibility of the battery depletion; and
determining a discount service applicable to the car sharing service when the user uses the vehicle based on the use request command, wherein
a usage form of the vehicle to charge the battery include a first usage form using the car sharing service and a second usage form using the vehicle without using the car sharing service, and
the microprocessor and the memory are configured to perform:
the transmitting including transmitting a selection request command of the usage form along with the use request command to the user terminal; and
the requesting including issuing a one-time key that is an authentication key and can be used only once to unlock the vehicle to the user terminal of the user selecting the second usage form based on the selection request command.

2. A battery depletion prevention apparatus comprising:
a microprocessor and a memory coupled to the microprocessor, wherein
the microprocessor and the memory are configured to perform:
registering an information of a user of a car sharing service;
acquiring an information of a remaining battery capacity of a vehicle which is used for the car sharing service;

predicting a possibility of a battery depletion of the vehicle based on the information of the remaining battery capacity;

transmitting a use request command for requesting the user to use the vehicle for charging a battery of the vehicle to a user terminal of the user based on the possibility of the battery depletion; and determining a discount service applicable to the car sharing service when the user uses the vehicle based on the use request command, wherein a usage form of the vehicle to charge the battery include a first usage form using the car sharing service and a second usage form using the vehicle without using the car sharing service, and the microprocessor and the memory are configured to perform:

the transmitting including transmitting a selection request command of the usage form along with the use request command to the user terminal; and the determining including determining the discount service so that a discount rate for the user using the vehicle in the second usage form is higher than the discount rate for the user using the vehicle in the first usage form.

3. A battery depletion prevention apparatus comprising:
a microprocessor and a memory coupled to the microprocessor, wherein
the microprocessor and the memory are configured to perform:
registering an information of a user of a car sharing service;
acquiring an information of a remaining battery capacity of a vehicle which is used for the car sharing service;
predicting a possibility of a battery depletion of the vehicle based on the information of the remaining battery capacity;
transmitting a use request command for requesting the user to use the vehicle for charging a battery of the vehicle to a user terminal of the user based on the possibility of the battery depletion; and
determining a discount service applicable to the car sharing service when the user uses the vehicle based on the use request command, wherein
the microprocessor and the memory are configured to perform:
the predicting including predicting the possibility of the battery depletion of the vehicle at a starting time of the next rental based on a reservation status of the vehicle used for the car sharing service.

4. A battery depletion prevention apparatus comprising:
a microprocessor and a memory coupled to the microprocessor, wherein
the microprocessor and the memory are configured to perform:
registering an information of a user of a car sharing service;
acquiring an information of a remaining battery capacity of a vehicle which is used for the car sharing service;
predicting a possibility of a battery depletion of the vehicle based on the information of the remaining battery capacity;
transmitting a use request command for requesting the user to use the vehicle for charging a battery of the vehicle to a user terminal of the user based on the possibility of the battery depletion; and
determining a discount service applicable to the car sharing service when the user uses the vehicle based on the use request command, wherein
the microprocessor and the memory are configured to perform:
the transmitting including transmitting, when there is no response from the user terminal to the use request command after a predetermined period is elapsed since the use request command is transmitted, a command for requesting a battery recovery measure of the vehicle to a terminal of a predetermined person of a business entity providing the car sharing service.

5. A battery depletion prevention system comprising;
the battery depletion prevention apparatus according to claim 2; and
an on-vehicle terminal capable of communicating with the battery depletion prevention apparatus.

6. The battery depletion prevention system according to claim 5, wherein
the on-vehicle terminal comprising:
a microprocessor and a memory coupled to the microprocessor, wherein
the microprocessor and the memory are configured to perform:
transmitting to the battery depletion prevention apparatus an information of a remaining battery capacity of a vehicle detected by a remaining battery capacity detection sensor for detecting the remaining battery capacity of the vehicle on which the on-vehicle terminal is mounted.

7. A battery depletion prevention method including:
registering an information of a user of a car sharing service;
acquiring an information of a remaining battery capacity of a vehicle which is used for the car sharing service;
predicting a possibility of a battery depletion of the vehicle based on the information of the remaining battery capacity;
transmitting a use request command for requesting the user to use the vehicle for charging a battery of the vehicle to a user terminal of the user based on the possibility of the battery depletion; and
determining a discount service applicable to the car sharing service when the user uses the vehicle based on the use request command, wherein
a usage form of the vehicle to charge the battery include a first usage form using the car sharing service and a second usage form using the vehicle without using the car sharing service, and
the transmitting includes transmitting a selection request command of the usage form along with the use request command to the user terminal; and
the determining includes determining the discount service so that a discount rate for the user using the vehicle in the second usage form is higher than the discount rate for the user using the vehicle in the first usage form.

* * * * *